United States Patent
Karri et al.

(10) Patent No.: US 12,028,379 B2
(45) Date of Patent: Jul. 2, 2024

(54) VIRTUAL REALITY GAMIFICATION-BASED SECURITY NEED SIMULATION AND CONFIGURATION IN ANY SMART SURROUNDING

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Sri Harsha Varada, Vizianagaram (IN); Mahendra Asapu, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 17/200,883

(22) Filed: Mar. 14, 2021

(65) Prior Publication Data

US 2022/0294827 A1  Sep. 15, 2022

(51) Int. Cl.
*H04L 9/40* (2022.01)
*G06F 3/01* (2006.01)
*G06F 21/00* (2013.01)
*G06N 20/00* (2019.01)

(Continued)

(52) U.S. Cl.
CPC .............. *H04L 63/20* (2013.01); *G06F 3/011* (2013.01); *G06N 20/00* (2019.01); *G16Y 10/75* (2020.01); *G16Y 30/10* (2020.01)

(58) Field of Classification Search
CPC ....... H04L 63/20; H04L 63/107; H04L 63/10; H04L 63/1408; H04L 63/1441; G16Y 30/10; G06F 21/55; G06F 21/554; G06F 21/577; G06F 21/604
See application file for complete search history.

(56) References Cited

U.S. PATENT DOCUMENTS

| 10,380,875 B1 | 8/2019 | Roberts |
| 10,600,297 B2 | 3/2020 | Kerzner |
| 2018/0018462 A1* | 1/2018 | Grossman ............... H04L 63/14 |

(Continued)

OTHER PUBLICATIONS

"Method and System for AR-Based Configuration of IoT-Enabled Devices Based on Situational Context", IP.com No. IPCOM000261475D, IP.com Electronic Publication Date: Mar. 7, 2020, 5 pps., <https://priorart.ip.com/IPCOM/000261475>.

*Primary Examiner* — Edward Zee
(74) *Attorney, Agent, or Firm* — Kristofer Haggerty

(57) ABSTRACT

Aspects of the present invention disclose a method for configuring security settings of a defined area that includes internet of things (IoT) devices for contextual situations utilizing virtual reality (VR) and gamification. The method includes one or more processors identifying an IoT device within a defined area. The method further includes collecting data of the IoT device corresponding to the defined area. The method further includes generating a first VR interactive scene in a VR environment corresponding to physical attributes of the defined area, wherein the VR interactive scene is based on a set of conditions of a knowledge corpus corresponding to the collected data of the IoT device. The method further includes identifying a security threat in the VR environment. The method further includes configuring a security rule of the defined area that modifies functions of the IoT device based on the set of conditions.

17 Claims, 3 Drawing Sheets

(51) Int. Cl.
*G16Y 10/75* (2020.01)
*G16Y 30/10* (2020.01)

(56) References Cited

U.S. PATENT DOCUMENTS

2020/0104522 A1\* 4/2020 Collart .................... G06T 19/20
2020/0280459 A1  9/2020 Goldstein \* cited by examiner

VIRTUAL REALITY GAMIFICATION-BASED SECURITY NEED SIMULATION AND CONFIGURATION IN ANY SMART SURROUNDING

BACKGROUND OF THE INVENTION

The present invention relates generally to the field of mobile devices, and more particularly to security configuration of a defined area of a smart environment.

Virtual reality (VR) is a computer-simulated environment, whether that environment is a simulation of the real world or an imaginary world, where users can interact with a virtual environment or a virtual artifact either through the use of standard input devices or specialized multidirectional input devices. Virtual Reality is often used to describe a wide variety of applications, commonly associated with its immersive, highly visual, three-dimensional (3D) environments. The development of Computer Aided Design (CAD) software, graphics hardware acceleration, head-mounted displays, database gloves, and miniaturization have helped popularize the notion.

Augmented Reality (AR) provides a live view of a physical real-world environment whose elements are merged with and/or augmented by virtual computer-generated imagery to create a mixed reality. The augmentation is conventionally in real-time and in semantic context with environmental elements. With the help of advanced AR technology (e.g., adding computer vision and object recognition) the information about the surrounding real world of the user becomes interactive and digitally usable.

Gamification is the application of game-design elements and game principles in non-game contexts. Gamification can also be defined as a set of activities and processes to solve problems by using or applying the characteristics of game elements. Gamification commonly employs game design elements to improve user engagement, organizational productivity, flow, learning, crowdsourcing, knowledge retention, employee recruitment and evaluation, ease of use, usefulness of systems, physical exercise, traffic violations, voter apathy, public attitudes about alternative energy, and more.

SUMMARY

Aspects of the present invention disclose a method, computer program product, and system for configuring security settings of a defined area that includes internet of things (IoT) enabled devices for contextual situations utilizing virtual reality (VR) and gamification. The method includes one or more processors identifying an IoT device within a first defined area. The method further includes one or more processors collecting data of the IoT device corresponding to the first defined area. The method further includes one or more processors generating a first VR interactive scene in a VR environment corresponding to physical attributes of the first defined area, wherein the VR interactive scene is based at least in part on a set of conditions of a knowledge corpus corresponding to the collected data of the IoT device. The method further includes one or more processors identifying a security threat in the VR environment. The method further includes one or more processors configuring a security rule of the first defined area that modifies functions of the IoT device based at least in part on the set of conditions.

DETAILED DESCRIPTION

Figure 1:
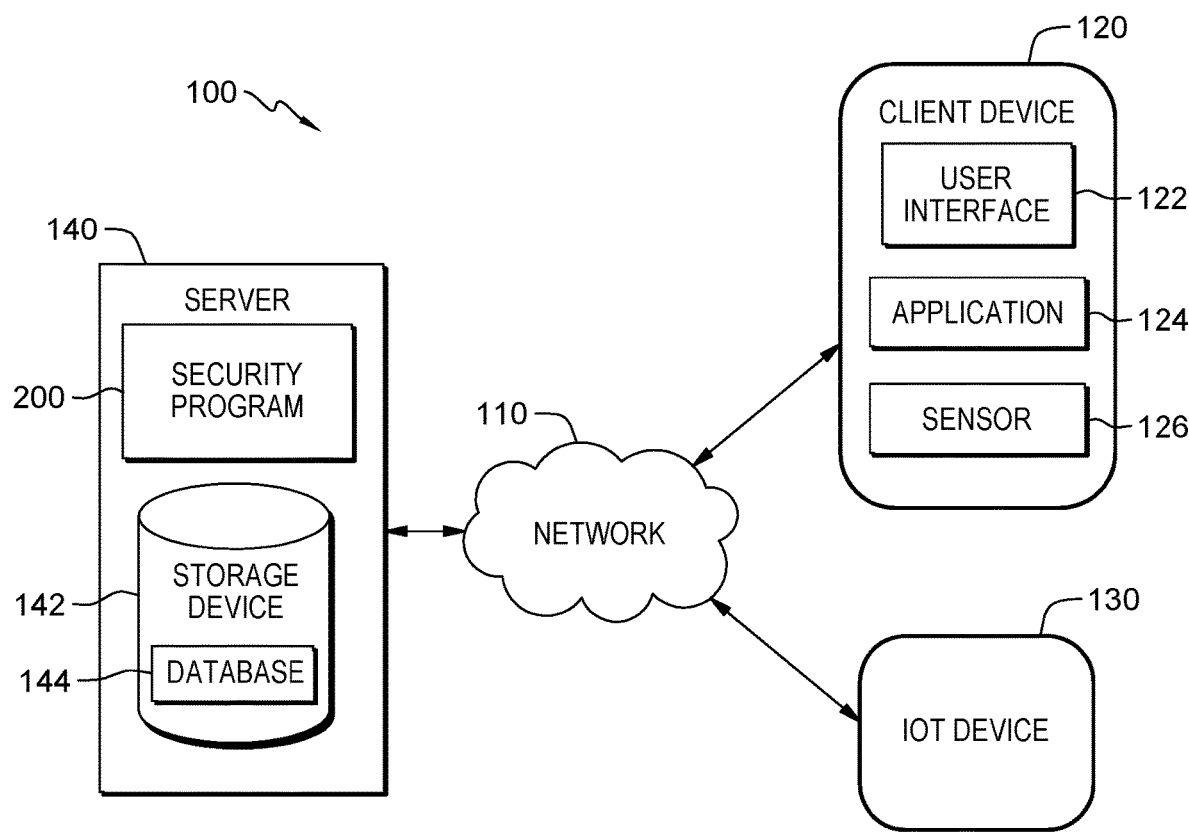
FIG. 1 is a functional block diagram of a data processing environment, in accordance with an embodiment of the present invention.

Embodiments of the present invention allow for configuring security settings of a defined area for contextual situations utilizing virtual reality (VR) and gamification. Embodiments of the present invention create various contextual situations in a VR based defined area of a smart environment to assist a user in applying security rules of various internet of things (IoT) enabled devices of the VR based defined area considering identified security threats of the various contextual situation. Other embodiments of the present invention enable a user to copy a security rule of a first VR based defined area with a first contextual situation and apply the security rule to a second VR based defined area with a second contextual situation the user is navigating. Additional embodiments of the present invention track various sources of information of IoT enabled devices and predict a contextual situation in a VR based defined area and apply an appropriate security rule in the VR based defined area. Further embodiments of the present invention utilize historical data of gamifications created for different contexts, results, and responses received for the gamifications to classify objects of a VR based defined area for current contextual requirements and physical surroundings for various user identities and update the gamification algorithm.

Some embodiments of the present invention recognize that in a defined area there can be various devices, and for various contextual situations in the defined area different security rules should be applied to the various devices. For example, if students are studying at home or taking an examination, then a set of security rules are to be applied to an artificial intelligence (AI) voice assistant system that prevent the students from getting answers from the AI voice assistance system. Alternatively, if a user is attending a meeting at home, then access to televisions or devices that play music should be configured so that access is restricted.

However, embodiments of the present invention recognize that challenges exist for a user to identify what types of contextual situation can arise in the defined area while configuring security settings for contextual situations that can arise based on objects, devices, and people present in the defined area. Embodiments of the present invention propose a solution to these challenges by creating a VR simulation of the various contextual situations with gamification and automatically applying security rules to devices when a contextual situation is present in the defined area based on security configuration actions of the user in the VR simulation of the defined area. For example, embodiments of the present invention simulates various contextual situations with a VR gamification environment and actions of a user in the VR gamification environment are utilized to configure the security setting to be applied to a defined area in the real world corresponding to the VR gamification environment when a contextual situation is identified.

Embodiments of the present invention can operate to improve security systems of building automation systems by preventing occupants of a defined space from intentionally or accidentally modify device configurations or control parameters within the building automation system. Additionally, embodiments of the present invention advance security systems of building automation systems by classifying devices of the building automation system as potential security threats based on an identity of a person physically present within the defined area.

Implementation of embodiments of the invention may take a variety of forms, and exemplary implementation details are discussed subsequently with reference to the Figures.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as storage device 142, database 144, sensor 126, and/or IOT device 130, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Security program 200 enables the authorized and secure processing of personal data. Security program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Security program 200 provides information regarding personal data and the nature (e.g., type, scope, purpose, duration, etc.) of the processing. Security program 200 provides the user with copies of stored personal data. Security program 200 allows the correction or completion of incorrect or incomplete personal data. Security program 200 allows the immediate deletion of personal data.

Distributed data processing environment 100 includes server 140, client device 120 and TOT device 130, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140, IOT device 130, and client device 120, and other computing devices (not shown) within distributed data processing environment 100.

Client device 120 can be one or more of a laptop computer, a tablet computer, a smart phone, smart watch, a smart speaker, virtual assistant, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 3, in accordance with embodiments of the present invention.

Client device 120 includes user interface 122 application 124, and sensor 126. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, e-mail program, or other media, etc.). In one embodiment, application 124 is mobile application software. For example, mobile application software, or an "app," is a computer program designed to run on smart phones, tablet computers and other mobile devices. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of security program 200. In yet another embodiment, application 124 is a VR application that utilizes images of sensor 126 to create an interactive scene corresponding to a defined area of client device 120.

Sensor 126 is a device, module, machine, or subsystem that detects events or changes in an environment of the device and sends the information to other electronics. In one embodiment, sensor 126 represents a variety of sensors of client device 120 that collects and provides various kinds of data. For example, client device 120 utilizes one or more sensors (e.g., a camera, etc.) for capturing images of an operating environment of client device 120.

IoT device(s) 130 can include one or more of a laptop computer, a tablet computer, a smart phone, smart watch, a smart speaker, virtual assistant, kitchen appliance, sensor, or any programmable electronic device capable of communicating with various components and devices within distributed data processing environment 100, via network 110. In general, IoT device(s) 130 represents one or more programmable electronic devices or combination of programmable electronic devices capable of executing machine readable program instructions and communicating with other computing devices (not shown) within distributed data processing environment 100 via a network, such as network 110. For example, IoT device(s) 130 can include wireless sensors, software, actuators, and/or computer devices that are attached to a particular object (e.g., smart building, office, building floor, etc.) that operates through the internet, enabling the transfer of data among objects or people automatically without human intervention. IoT device(s) 130 may include components as depicted and described in further detail with respect to FIG. 3, in accordance with embodiments of the present invention.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and security program 200. Storage device 142 can be implemented with any type of storage device, for example, persistent storage 305, which is capable of storing data that may be accessed and utilized by client device 120, IOT device 130, and server 140, such as a database server, a hard disk drive, or a flash memory. In one embodiment storage device 142 can represent multiple storage devices within server 140. In various embodiments of the present invention, storage device 142 stores numerous types of data which may include database 144. Database 144 may represent one or more organized collections of data stored and accessed from server 140. For example, database 144 includes historical data of a user, device usage, user profiles, security rules, etc. In one embodiment, data processing environment 100 can include additional servers (not shown) that host additional information that accessible via network 110.

Generally, security program 200 configures security settings of a defined area that includes IoT enabled devices for contextual situations utilizing virtual reality (VR) and gamification. In one embodiment, security program 200 utilizes application 124 to create a VR interactive scene for a user of client device 120. For example, security program 200 utilizes a VR application (e.g., application 124) to create a plurality of contextual situations (e.g., interactive scenes) in a defined area (e.g., smart building, office, industry floor, etc.) of a user (i.e., creating VR interactive scenes associated with an operating environment of client device 120 and the user). In this example, security program 200 utilizes a gamification algorithm to allow the user to apply security rules selectively in various IoT enabled devices (e.g., IOT device 130) in the plurality of contextual situations created in the VR application. As a result, security program 200 assists the user in identifying types of security threats included in each of the contextual situations of the defined area. In another embodiment, security program 200 utilizes application 124 to allow a user to interact with the VR interactive scene of client device 120. For example, security program 200 allows a user to perform interactions with VR content and configure various security rules for one or more IoT enabled devices (e.g., IOT device 130) within a defined area of the user.

In another embodiment, security program 200 utilizes data of sensor 126 and/or IOT device 130 to create the VR interactive scene corresponding to client device 120 and the user. For example, security program 200 collects images of a camera of a VR device (e.g., client device 120) of a user and location data (e.g., GPS location, coordinates, etc.) of one or more IoT enabled devices (e.g., IOT device 130) within an operating environment (e.g., defined area, enclosed area, etc.) associated with the VR device to create a virtual interactive scene based on the collected data (e.g., image and location data). In this example, security program 200 generates a contextual situation, which is a set of conditions that make up the circumstances that form the setting for the virtual interactive scene based on the exact physical environment, the IoT enabled devices present within the physical environment, identified people, calendar data, and historical activities of the user. As a result, security program 200 provides the user with an immersive experience of various contextual situations where an appropriate security rule is required.

In another embodiment, security program 200 applies a selected rule of a first defined area to TOT device 130 of a second defined area client device 120 is physically present within. For example, security program 200 enables a user to selectively copy a security rule from a VR environment (e.g., defined area, enclosed area, device operating environment, etc.) associated with a different contextual situation to a current VR environment a user is navigating using a VR device (e.g., client device 120). Also, security program 200 can utilize a voice query of the user to configure the security rules of the current VR environment or create various VR environments with various contextual situations.

In yet another embodiment, security program 200 utilizes data of one or more instances of IOT device 130 to determine VR interactive scene of the defined area. For example, security program 200 utilizes one or more IoT enable device (e.g., IOT device 130) to track various sources of data corresponding to an enclosed area (e.g., home) of a user to predict the contextual situation within the enclosed and apply an appropriate security rule to device of the enclosed area. In addition, security program 200 can utilize historical data of gamification created for different contextual situations, results, and responses received from the user for those gamifications to classify IoT enabled devices as safe and non-safe objects for a current contextual situation and enclosed area based on identified people. Furthermore, security program 200 improves a gamification algorithm based on feedback of the user (e.g., users' responses) by imposing and upgrading the recent security upgrades.

Figure 2:
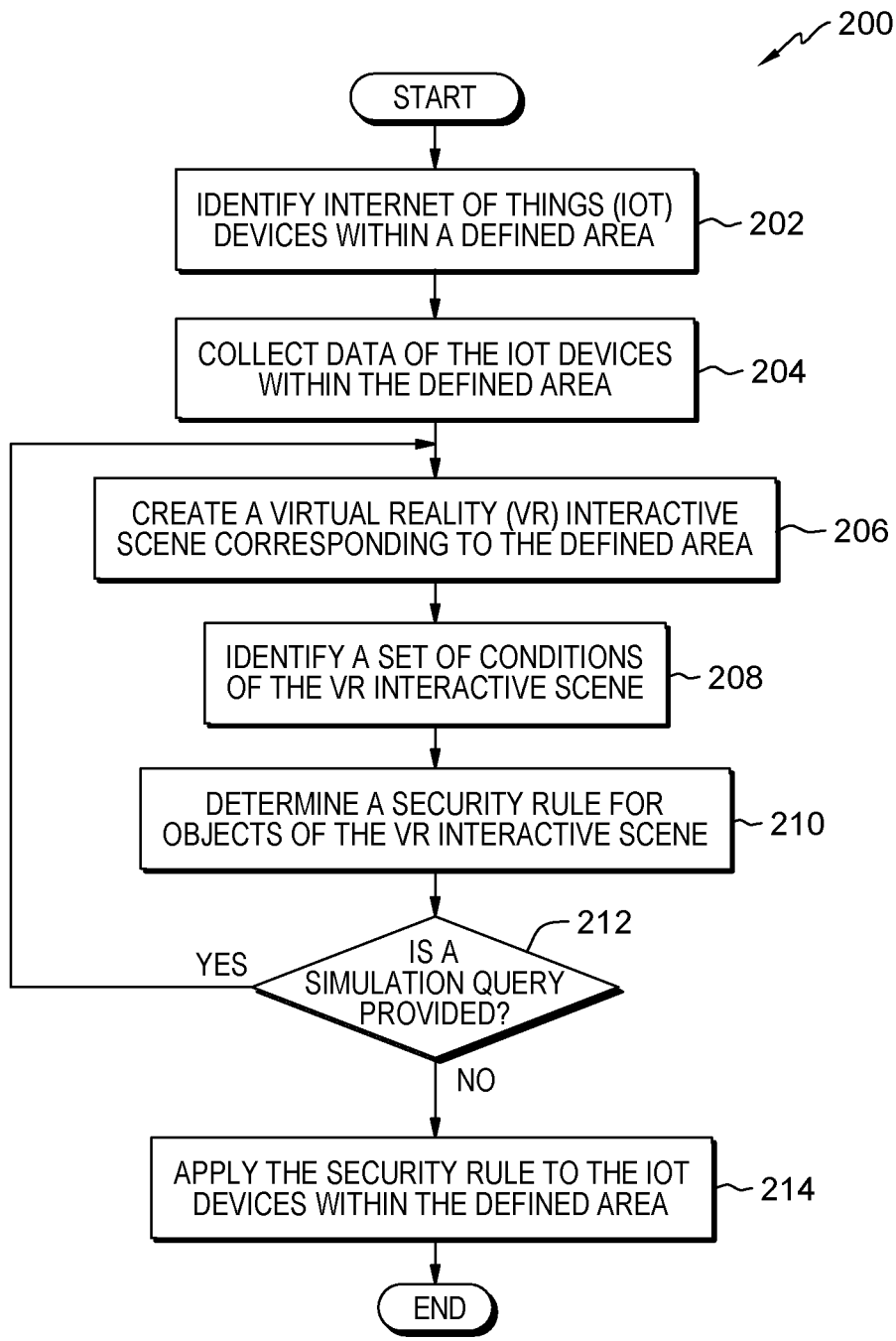
FIG. 2 is a flowchart depicting operational steps of a program, within the data processing environment of FIG. 1, for configuring security settings of a defined area that includes internet of things (IoT) devices for contextual situations utilizing virtual reality (VR) and gamification, in accordance with embodiments of the present invention.

FIG. 2 is a flowchart depicting operational steps of security program 200, a program that configures security settings of a defined area that includes IoT enabled devices for contextual situations utilizing virtual reality (VR) and gamification, in accordance with embodiments of the present invention. In one embodiment, security program 200 initiates in response to a user connecting client device 120 to security program 200 through network 110. For example, security program 200 initiates in response to a user registering (e.g., opting-in) a VR device (e.g., client device 120) with security program 200 via a WLAN (e.g., network 110). In another embodiment, security program 200 is a background application that continuously monitors client device 120. For example, security program 200 is a client-side application (e.g., application 124) that initiates upon booting of a VR device (e.g., client device 120) of a user.

In step 202, security program 200 identifies IoT devices within a defined area. In one embodiment, security program 200 identifies one or more instances of IOT device 130 within a defined area. For example, security program 200 identifies a plurality of IoT enabled devices (e.g., IOT device 130) within a floor (e.g., defined area) of a smart building. In this example, security program 200 transmits a query to each device connected to a shared network (e.g., network 110) to identify each of the plurality of IoT enabled devices and specifications of each of the plurality of IoT enabled devices. Additionally, security program 200 determines a communication protocol of the plurality of IoT enabled devices and attaches a unique identifier (e.g., alphanumeric value) to each identified IoT enabled device.

In step 204, security program 200 collects data of the IoT devices within the defined area. In various embodiments of the present invention a user opts-in and allows security program 200 to collect and process data of one or more IoT devices of the user to simulate and/or create various contextual situations within a VR environment. In one embodiment, security program 200 collects data of one or more instances of IOT device 130 within a defined area. For example, security program 200 collects various types of data from identified IoT enabled devices (e.g., IOT device 130) corresponding to a user and an operating environment of the identified IoT enabled devices. In this example, security program 200 collects and stores usage information (e.g., tasks performed), device positions relative to other devices, and images of surroundings of various identified IoT enabled devices. Additionally, security program 200 utilizes the IoT enabled devices and VR headset (e.g., client device 120) to collect present and past user activities (e.g., studying, meeting, partying, etc.) and roles of the user within a floor (e.g., defined area) of a smart building and generates a knowledge corpus (e.g., database 144) of historical data corresponding to the user and the floor.

In step 206, security program 200 creates a VR interactive scene corresponding to the defined area. In various embodiments of the present invention when a user requests or security program 200 identifies a contextual situation, gamification attributes are added to the contextual situation to encourage the user to identify the types of additional security settings are appropriate for IoT devices in various contextual situations.

In one embodiment, security program 200 creates a contextual situation corresponding to the defined area. For example, security program 200 creates a VR environment corresponding a floor (e.g., defined area) of a smart building for a user to navigate utilizing a VR headset (e.g., client device 120). In this example, security program 200 utilizes position data and images from the VR headset and plurality of IoT enabled devices (e.g., IOT device 130) to create the VR environment that includes objects (e.g., people, IoT devices, etc.) corresponding to the physical attributes of the floor of the smart building.

In another embodiment, security program 200 modifies a VR environment corresponding to the defined area to create a contextual situation. For example, security program 200 utilizes a knowledge corpus (e.g., database 144) and created VR environments (e.g., simulated environments) to generate a VR interactive scene (e.g., contextual situation) within a VR environment (i.e., generate different types of contextual situations where security configuration is required). In this example, security program 200 can recreate a user activity (e.g., party setting, meeting, etc.) of a knowledge corpus (e.g., database 144) corresponding to the user by adding objects (e.g., people, objects, etc.) to the VR environment. As a result, the user can navigate and interact with objects of the VR interactive scene, which is based on a floor of a smart building the user is physically present in.

In yet another embodiment, security program 200 utilizes a gamification algorithm and client device 120 to aide a user in identifying security threats of a contextual situation. For example, security program 200 utilizes a knowledge corpus (e.g., database 144) of various security configuration from a plurality of users and various VR interactive scenes to create a training data set and test data set to train a machine learning algorithm (e.g., support vector machines, artificial neural networks, etc.) to classify (e.g., safe or not safe) objects of a VR environment based on a set of conditions of a VR interactive scene of the VR environment. In this example, security program 200 allows the user to utilize a VR headset (e.g., client device 120) to navigate and apply various security rules to the objects of the VR interactive scene. Additionally, security program 200 configures security settings of corresponding IoT enabled devices (e.g., IOT device 130) based on the applied security rules. Also, security program 200 utilizes user responses (e.g., applying security rules or upgrading security settings) to update the machine learning algorithm.

In step 208, security program 200 identifies a set of conditions of the VR interactive scene. In one embodiment, security program 200 utilizes TOT device 130 to identify a set of conditions corresponding to a created simulated environment. For example, security program 200 utilizes a knowledge corpus (e.g., database 144) to identify conditions (e.g., presence of IoT enabled devices, identities of people, types of activities, historical activities, historical preferences, etc.) of a VR interactive scene of a VR environment. In this example, security program 200 can utilize identified IoT devices to track activities and people within the VR environment.

In one scenario, security program 200 utilizes a video feed of a VR headset device (e.g., client device 120) to detect a person and a voice assistant device (e.g., IOT device 130) in a VR environment. Additionally, security program 200 utilizes a knowledge corpus to identify the person and the functionality of the voice assistant device. Also, security program 200 accesses a calendar corresponding to the identified person and determines that the person is currently scheduled to take an exam. Furthermore, security program 200 compares conditions identified in the VR environment and determines that the conditions are correlated to a home testing VR interactive scene.

In step 210, security program 200 determines a security rule for objects of the VR interactive scene. In one embodiment, security program 200 determines a security for one or more instances of IOT device 130 in a contextual situation. For example, security program 200 identifying various VR interactive scenes (e.g., contextual situations) of a knowledge corpus (e.g., database 144) corresponding to a user to determine appropriate security rules corresponding to identified conditions of a VR environment of the user. In this example, security program 200 utilizes a machine learning algorithm to identify types of security threats and security rules that the user can implement in a current VR interactive scene. In an alternative example, security program 200 allows the user to copy a security rule of a first floor of a smart building and apply the security rule to a second floor where the user is physically present.

In another example, security program 200 utilizes IoT enabled devices (e.g., IOT device 130) to track various sources of information that include conditions of a floor (e.g., defined area) of a smart building and predict a contextual situation (e.g., VR interactive scene) of the floor and configure security rules for the IoT enabled devices of the floor. As a result, based on past interactions, responses, and applied rules of the user with a VR interactive scene, security program 200 can identify a security threat and the user can proactively apply a security rule to the predicted contextual situation. In another embodiment, security program 200 classifies one or more instances of IOT device 130 in the contextual situation. For example, security program 200 utilizes a machine learning algorithm to classify one or more objects that correspond to IOT device 130 within a contextual situation. For example, security program 200 utilize a trained support vector machine (SVM) to classify IoT enabled devices as "safe" and "non-safe" for conditions of a VR interactive scene with respect to roles of identified people.

In decision step 212, security program 200 determines whether a simulation query is provided. In one embodiment, security program 200 determines whether a query of a user includes a request to create a simulated contextual situation. For example, security program 200 determines whether a user provides a simulation query to a VR headset (e.g., client device 120) or IoT enabled device (e.g., IOT device 130). In this example, security program 200 utilizes natural language processing (NLP) (e.g., speech to text) to determine whether an audible command of the user includes a request to perform a task to create a VR interactive scene.

In another embodiment, if security program 200 determines that a query of a user includes a request to create a simulated contextual situation (decision step 212, "YES" branch), then security program 200 creates a contextual situation corresponding to the defined area as discussed in step 206. For example, if security program 200 detects an audible command of a user and determines that the audible command is related to a task to create a VR interactive scene, then security program 200 utilizes historical data of a knowledge corpus (e.g., database 144) to create the VR interactive device that includes conditions corresponding to the audible command. As a result, security program 200 enables the user can navigate the VR interactive scene within a VR environment and identify what types of additional security threats and modify security configuration settings of IoT enabled devices to prevent unintended uses/access due to the additional security threats.

In another embodiment, if security program 200 determines that a query of a user does not include a request to create a simulated contextual situation (decision step 212, "NO" branch), then security program 200 configures one or more instances of IOT device 130 based on a security rule of a user as discussed below in step 214. For example, if security program 200 detects an audible command of a user and determines that the audible command is not related to a task to create a VR interactive scene, then security program 200 utilizes activities of the user (e.g., past or present) in a VR environment to configure security settings to address security threats posed by conditions of the VR environment.

In step 214, security program 200 applies the security rule to the IoT device within the defined area. In one embodiment, security program 200 configures one or more instances of IOT device 130 based on a security rule of a user. For example, security program 200 applies various types of security rules to IoT enabled devices (e.g., IOT device 130). In this example, security program 200 configures security settings of the IoT enabled devices according to the various security rules on a floor of a smart building that corresponds to updates a user provides in a VR interactive scene of a VR environment. Additionally, security program 200 can utilize classifications of an object (e.g., IOT device 130) within the VR interactive scene to identify a security rule to apply based on historical actions of a user or a plurality of users.

In another example, security program 200 utilizes interactions of a user in a simulated gamification surrounding to generate a knowledge corpus (e.g., database 144) of correlated security threats and security rules applied by a user. In this example, security program 200 can utilize IoT enabled devices to monitor conditions of a floor of a smart building and proactively apply the security rule. As a result, security program 200 implements appropriate security rules of a VR interactive scene of a VR environment on the floor of the smart building when similar conditions are detected.

In one scenario, if security program 200 determines that a person, identified as a student, is in a room with a virtual assistant (e.g., TOT device 130) and is scheduled to take an exam (e.g., calendar data entry), then security program 200 determines one or more functions of the virtual assistant. Additionally, security program 200 utilizes a knowledge corpus corresponding to a user to identify user configurations for similar devices in a similar contextual situation. In this scenario, security program 200 can disable query functions of the virtual assistant to prevent the student from breaking test taking protocols.

Figure 3:
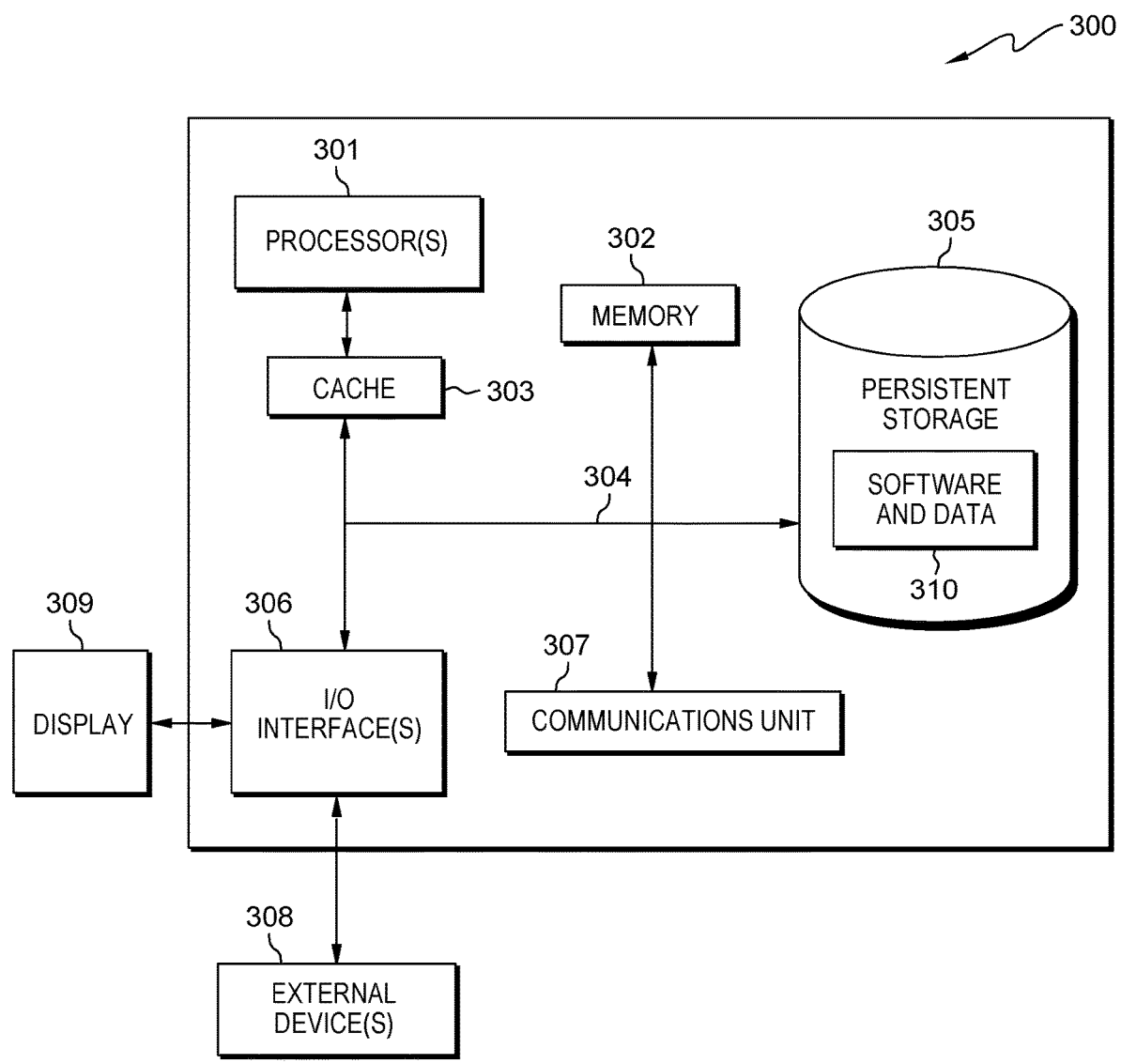
FIG. 3 is a block diagram of components of FIG. 1, in accordance with an embodiment of the present invention.

FIG. 3 depicts a block diagram of components of client device 120, IOT device 130, and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of user interface 122, application 124, and sensor 126. With respect to server 140, software and data 310 includes data of storage device 142 and security program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    identifying, by one or more processors, an internet of things (IoT) device within a first defined area;
    collecting, by one or more processors, data of the IoT device corresponding to the first defined area;
    generating, by one or more processors, a first virtual reality (VR) interactive scene in a VR environment corresponding to physical attributes of the first defined area, wherein a VR interactive scene is based at least in part on a set of conditions of a knowledge corpus corresponding to the collected data of the IoT device;
    identifying, by one or more processors, a security threat in the VR environment;
    configuring, by one or more processors, a security rule of the first defined area that modifies functions of the IoT device based at least in part on the set of conditions;
    determining, by one or more processors, that a user provides a simulation query, wherein the simulation query corresponds to a task to create a second VR interactive scene in the VR environment;
    identifying, by one or more processors, a user interaction with one or more objects of the second VR interactive scene, wherein the user interaction is the selection of a rule; and
    configuring, by one or more processors, security settings for the second VR interactive scene based at least in part on the user interaction with the one or more objects.

2. The method of claim 1, further comprising:
    selecting, by one or more processors, the security rule of the first defined area from a VR device; and
    applying, by one or more processors, the selected security rule in a second defined area, wherein the first VR interactive scene corresponding to the first defined area differs from a second VR interactive scene of the second defined area.

3. The method of claim 1, further comprising:
    tracking, by one or more processors, one or more conditions of the first defined area in a feed of the IoT device; and
    predicting, by one or more processors, a second VR interactive scene of the first defined area based at least in part on the knowledge corpus corresponding to the first defined area.

4. The method of claim 1, further comprising:
    adding, by one or more processors, a gamification attribute to an object of the first VR interactive scene in the VR environment that corresponds to the IoT device within the first defined area.

5. The method of claim 1, further comprising:
    identifying, by one or more processors, one or more conditions of the first VR interactive scene of the first defined area; and
    classifying, by one or more processors, one or more objects of the first VR interactive scene of the first defined area based at least in part on presence of an identified party with the first defined area.

6. The method of claim 5, further comprising:
identifying, by one or more processors, a user interaction corresponding to the classified one or more objects, wherein the user interaction is a response of the user; and
upgrading, by one or more processors, the security rule in a machine learning algorithm based at least in part on the identified party interaction.

7. A computer program product comprising:
one or more computer readable storage media and program instructions stored on the one or more computer readable storage media, the program instructions comprising:
program instructions to identify an internet of things (IoT) device within a first defined area;
program instructions to collect data of the IoT device corresponding to the first defined area;
program instructions to generate a first virtual reality (VR) interactive scene in a VR environment corresponding to physical attributes of the first defined area, wherein a VR interactive scene is based at least in part on a set of conditions of a knowledge corpus corresponding to the collected data of the IoT device;
program instructions to identify a security threat in the VR environment; program instructions to configure a security rule of the first defined area that modifies functions of the IoT device based at least in part on the set of conditions;
program instructions to determine, by one or more processors, that a user provides a simulation query, wherein the simulation query corresponds to a task to create a second VR interactive scene in the VR environment;
program instructions to identify, by one or more processors, a user interaction with one or more objects of the second VR interactive scene, wherein the user interaction is the selection of a rule; and
program instructions to configure, by one or more processors, security settings for the second VR interactive scene based at least in part on the user interaction with the one or more objects.

8. The computer program product of claim 7, further comprising program instructions, stored on the one or more computer readable storage media, to:
select the security rule of the first defined area from a VR device; and
apply the selected security rule in a second defined area, wherein the first VR interactive scene corresponding to the first defined area differs from a second VR interactive scene of the second defined area.

9. The computer program product of claim 7, further comprising program instructions, stored on the one or more computer readable storage media, to:
track one or more conditions of the first defined area in a feed of the IoT device; and
predict a second VR interactive scene of the first defined area based at least in part on the knowledge corpus corresponding to the first defined area.

10. The computer program product of claim 7, further comprising program instructions, stored on the one or more computer readable storage media, to:
add a gamification attribute to an object of the first VR interactive scene in the VR environment that corresponds to the IoT device within the first defined area.

11. The computer program product of claim 7, further comprising program instructions, stored on the one or more computer readable storage media, to:
identify one or more conditions of the first VR interactive scene of the first defined area; and
classify one or more objects of the first VR interactive scene of the first defined area based at least in part on presence of an identified party with the first defined area.

12. The computer program product of claim 11, further comprising program instructions, stored on the one or more computer readable storage media, to:
identify a user interaction corresponding to the classified one or more objects, wherein the user interaction is a response of the user; and
upgrade the security rule in a machine learning algorithm based at least in part on the identified party interaction.

13. A computer system:
one or more computer processors;
one or more computer readable storage media; and
program instructions stored on the computer readable storage media for execution by at least one of the one or more processors, the program instructions comprising:
program instructions to identify an internet of things (IoT) device within a first defined area;
program instructions to collect data of the IoT device corresponding to the first defined area;
program instructions to generate a first virtual reality (VR) interactive scene in a VR environment corresponding to physical attributes of the first defined area, wherein a VR interactive scene is based at least in part on a set of conditions of a knowledge corpus corresponding to the collected data of the IoT device;
program instructions to identify a security threat in the VR environment; program instructions to configure a security rule of the first defined area that modifies functions of the IoT device based at least in part on the set of conditions;
program instructions to determine, by one or more processors, that a user provides a simulation query, wherein the simulation query corresponds to a task to create a second VR interactive scene in the VR environment;
program instructions to identify, by one or more processors, a user interaction with one or more objects of the second VR interactive scene, wherein the user interaction is the selection of a rule; and
program instructions to configure, by one or more processors, security settings for the second VR interactive scene based at least in part on the user interaction with the one or more objects.

14. The computer system of claim 13, further comprising program instructions, stored on the one or more computer readable storage media for execution by at least one of the one or more processors, to:
select the security rule of the first defined area from a VR device; and
apply the selected security rule in a second defined area, wherein the first VR interactive scene corresponding to the first defined area differs from a second VR interactive scene of the second defined area.

15. The computer system of claim 13, further comprising program instructions, stored on the one or more computer readable storage media for execution by at least one of the one or more processors, to:
track one or more conditions of the first defined area in a feed of the IoT device; and
predict a second VR interactive scene of the first defined area based at least in part on the knowledge corpus corresponding to the first defined area.

16. The computer system of claim 13, further comprising program instructions, stored on the one or more computer readable storage media for execution by at least one of the one or more processors, to:
  add a gamification attribute to an object of the first VR interactive scene in the VR environment that corresponds to the IoT device within the first defined area.

17. The computer system of claim 13, further comprising program instructions, stored on the one or more computer readable storage media for execution by at least one of the one or more processors, to:
  identify one or more conditions of the first VR interactive scene of the first defined area; and
  classify one or more objects of the first VR interactive scene of the first defined area based at least in part on presence of an identified party with the first defined area.

* * * * *